US009838369B2

(12) United States Patent
Ram et al.

(10) Patent No.: US 9,838,369 B2
(45) Date of Patent: *Dec. 5, 2017

(54) RESTRICTING BROADCAST AND MULTICAST TRAFFIC IN A WIRELESS NETWORK TO A VLAN (71) Applicant: MERU NETWORKS, Sunnyvale, CA (US)

(72) Inventors: Mohan Ram, Banashankari (IN); Sung-Wook Han, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,561

(22) Filed: Feb. 13, 2016

(65) Prior Publication Data

US 2016/0277375 A1  Sep. 22, 2016

Related U.S. Application Data (63) Continuation of application No. 13/772,358, filed on Feb. 21, 2013, now Pat. No. 9,326,144.

(51) Int. Cl.
*H04L 29/06* (2006.01)
*H04W 12/08* (2009.01)
(Continued)

(52) U.S. Cl.
CPC .......... *H04L 63/065* (2013.01); *H04L 45/586* (2013.01); *H04L 49/354* (2013.01);
(Continued)

(58) Field of Classification Search
CPC ... H04L 12/189; H04L 45/586; H04L 49/354; H04L 63/065; H04L 63/10; H04L 63/104;
(Continued)

(56) References Cited

U.S. PATENT DOCUMENTS 5,548,646 A    8/1996   Aziz et al.
6,041,358 A *   3/2000   Huang ................ H04L 12/4608
                                                                           370/331

(Continued)

FOREIGN PATENT DOCUMENTS

EP         1887758 A2 *   2/2008   ........... H04L 63/062
EP         1887758 A3 *   6/2011   ........... H04L 63/062

OTHER PUBLICATIONS

Krothapalli, "A Toolkit for Automating and Visualizing VLAN Configuration", SafeConfig'09, Nov. 9, 2009, Chicago, Illinois, USA, pp. 63-70.*

(Continued)

*Primary Examiner* — Luu Pham
*Assistant Examiner* — Walter Malinowski
(74) *Attorney, Agent, or Firm* — Law Office of Dorian Cartwright; Dorian Cartwright (57) ABSTRACT

Traffic broadcast to a VLAN is restricted. To do so, a plurality of stations are associated with a BSSID (basic service set identifier). A first VLAN is configured by sending a first group key to each station from the plurality of stations that is a member of the first VLAN, wherein each VLAN is associated with a unique group key. One or more frames addressed to the first VLAN are received. The one or more frames are encrypted with the first group key to prevent stations without the first group key from being able to decrypt the one or more frames. The one or more encrypted VLAN frames are broadcast to the plurality of stations associated with the BSSID.

21 Claims, 7 Drawing Sheets (51) Int. Cl.
  *H04W 12/04* (2009.01)
  *H04L 12/713* (2013.01)
  *H04L 12/931* (2013.01)
  *H04W 36/08* (2009.01)
  *H04L 12/18* (2006.01)
  *H04W 88/08* (2009.01)

(52) U.S. Cl.
  CPC ............ *H04L 63/10* (2013.01); *H04L 63/104* (2013.01); *H04W 12/04* (2013.01); *H04W 12/08* (2013.01); *H04W 36/08* (2013.01); *H04L 12/189* (2013.01); *H04W 88/08* (2013.01)

(58) Field of Classification Search
  CPC ... H04W 12/04; H04W 12/08; H04W 12/189; H04W 36/08
  USPC .......................................................... 713/153
  See application file for complete search history.

(56) References Cited

U.S. PATENT DOCUMENTS

| | | | |
|---|---|---|---|
| 6,240,513 B1 | 5/2001 | Friedman et al. | |
| 6,839,348 B2 | 1/2005 | Tang et al. | |
| 6,847,620 B1* | 1/2005 | Meier | H04L 12/4641 370/328 |
| 7,280,520 B2* | 10/2007 | Melville | H04W 48/18 370/338 |
| 7,301,946 B2 | 11/2007 | Meier et al. | |
| 8,611,270 B1* | 12/2013 | Sapkota | H04W 4/06 370/312 |
| 2003/0005331 A1 | 1/2003 | Williams | |
| 2004/0028003 A1* | 2/2004 | Diener | H04L 1/0001 370/319 |
| 2004/0103282 A1* | 5/2004 | Meier | G06Q 20/3674 713/171 |
| 2005/0025160 A1* | 2/2005 | Meier | H04L 12/185 370/395.53 |
| 2005/0086481 A1 | 4/2005 | Winget | |
| 2005/0180367 A1* | 8/2005 | Dooley | H04L 29/12254 370/338 |
| 2006/0107108 A1 | 5/2006 | Geng et al. | |
| 2006/0285529 A1* | 12/2006 | Hares | H04L 45/16 370/338 |
| 2007/0015514 A1* | 1/2007 | Bishop | H04W 16/24 455/445 |
| 2007/0081477 A1 | 4/2007 | Jakkahalli et al. | |
| 2007/0223703 A1 | 9/2007 | Verma et al. | |
| 2007/0260720 A1 | 11/2007 | Morain | |
| 2007/0286108 A1* | 12/2007 | Meier | H04L 12/185 370/312 |
| 2007/0288997 A1* | 12/2007 | Meier | G06Q 20/3674 726/4 |
| 2008/0130880 A1* | 6/2008 | Frindell | G06Q 10/10 380/45 |
| 2008/0151868 A1* | 6/2008 | Kezys | H04L 12/4641 370/352 |
| 2008/0155252 A1* | 6/2008 | Nambiar | H04L 12/4633 713/153 |
| 2008/0215762 A1 | 9/2008 | Chan et al. | |
| 2008/0256646 A1* | 10/2008 | Strom | H04L 63/06 726/29 |
| 2009/0067436 A1* | 3/2009 | Gast | H04L 12/4679 370/395.53 |
| 2010/0054179 A1 | 3/2010 | Meyer | |
| 2010/0278343 A1 | 11/2010 | Goto | |
| 2012/0210136 A1* | 8/2012 | Haddad | H04L 63/0823 713/176 |
| 2013/0003747 A1* | 1/2013 | Raman | H04L 45/745 370/401 |
| 2013/0028176 A1 | 1/2013 | Le Sage | |
| 2014/0286321 A1* | 9/2014 | Balian | H04W 12/06 370/338 |

OTHER PUBLICATIONS

Shukla, "Educational Institutes: Wireless Network Standards, Security and Future", pp. 76-82.*
IEEE Standard for Broadband over Power Line Networks: Medium Access Control and Physical Layer Specifications, IEEE Std 1901-2010, Dec. 30, 2010, 1586 pages.*
IEEE P802.11s/D7.0 Draft Standard for Information Technology—Telecommunications and information exchange between systems—Local and metropolitan area networks—Specific Requirements, Part 11: Wireless LAN Medium Access Control (MAC) and Physical Layer (PHY) specifications—Amendment 1: Mesh Networkings, Jul. 2010, IEEE, 339 pages.*
Noack, "Group Key Agreement for Wireless Mesh Networks", The 5th LCN Workshop on Security in Communications Networks (SICK 2009), Zurich Switzerland, Oct. 20-23, 2009, pp. 945-952.*
Ennis, The Wireless Tightrope: An Economical, Secure and User Friendly Approach for the Wireless Campus, SIGUCCS'05, Nov. 6-9, 2005, Monterey California, pp. 62-67.*
Congdon, "IEEE 802.1X Remote Authentication Dial in User Service (RADIUS) Usage Guidelines (RFC3580)", Internet Society Requests for Comment, IPCOM000019164, Sep. 1, 2003, 32 pages.
WLAN, Sep. 9, 2009, WLAN Service Configuration, http://www.h3c.com/portal/Technical_Support_Documents/Technical_Documents?WLAN/H3C_LS8M1WCMA0_Access_Controller_Module/Configuration/User_Manual/H3C_WX_Series_Access_Controllers_WBCM-6BCM-6PW103/200909/646410_1285_).htm, 45 pages.
Meiners, "WPA Migration Mode: WEP is back to hant you . . . ", www.coresecurity.com, Jul. 2010, 19 pages.

* cited by examiner

RESTRICTING BROADCAST AND MULTICAST TRAFFIC IN A WIRELESS NETWORK TO A VLAN

CROSS-REFERENCE TO RELATED APPLICATIONS

This application is a continuation of U.S. application Ser. No. 13/772,358, filed Feb. 21, 2013, entitled RESTRICTING BROADCAST AND MULTICAST TRAFFIC IN A WIRELESS NETWORK TO A VLAN, by Mohan Ram, et al., the contents being hereby incorporated by reference in its entirety.

FIELD OF THE INVENTION

The invention relates generally to computer networking, and more specifically, to restricting broadcast traffic in a wireless network to a VLAN.

BACKGROUND OF THE INVENTION

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

A VLAN (virtual local access network) networks a group of computers together that are not necessarily connected to the same LAN. As a result, one member can broadcast a message to all of the VLAN members using a single packet sent to the Ethernet broadcast or a multicast address rather than sending individual packets to each member. Conventionally, an access point maintains a VLAN table which correlates the Ethernet broadcast or multicast address to particular unicast addresses of each member of that VLAN. It is the access point that sends the frame in a unicast message to each of the members to complete the communication. However, access points typically have low processing capabilities and the burden of multiple address translations for a single message can slow down traffic throughput at the access point.

Another conventional technique dedicates an access point to a particular VLAN. In this way, each of the members share the same BSSID of the access point. Because of the unified membership, the access point can simply broadcast VLAN messages to all connected computers without the additional processing. Problematically, this requires a static association of members to a VLAN which is often not feasible in Enterprise Wireless LAN networks where the members that share same BSSID are dynamically associated to a VLAN based on a user defined policy What is needed is a robust technique for access points to implement a VLAN that leverages the processing conservation of broadcasting without making the access point unavailable to other stations.

SUMMARY

To meet the above-described needs, methods, computer program products, and systems for restricting broadcast traffic to a VLAN (virtual local access network) are provided.

In one embodiment, a plurality of stations with a BSSID (basic service set identifier). A first VLAN is configured by sending a first group key to each station from the plurality of stations that is a member of the first VLAN, wherein each VLAN is associated with a unique group key. One or more frames addressed to the first VLAN are received. The one or more frames are encrypted with the first group key to prevent stations without the first group key from being able to decrypt the one or more frames. The one or more encrypted VLAN frames are broadcast to the plurality of stations associated with the BSSID.

Advantageously, broadcasting is restricted while reducing a processing load on an access point. Further, an access point need not be dedicated to a VLAN. Finally, VLAN members can be retroactively added to a VLAN without a hard handoff.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for restricting broadcast traffic for a VLAN (virtual local access network) on a wireless network are disclosed. The following description is set forth merely for the purpose of illustration and is not intended to be limiting. For example, the preferred embodiments refer to broadcast traffic, but are similarly applicable to multicast traffic.

Figure 1A:
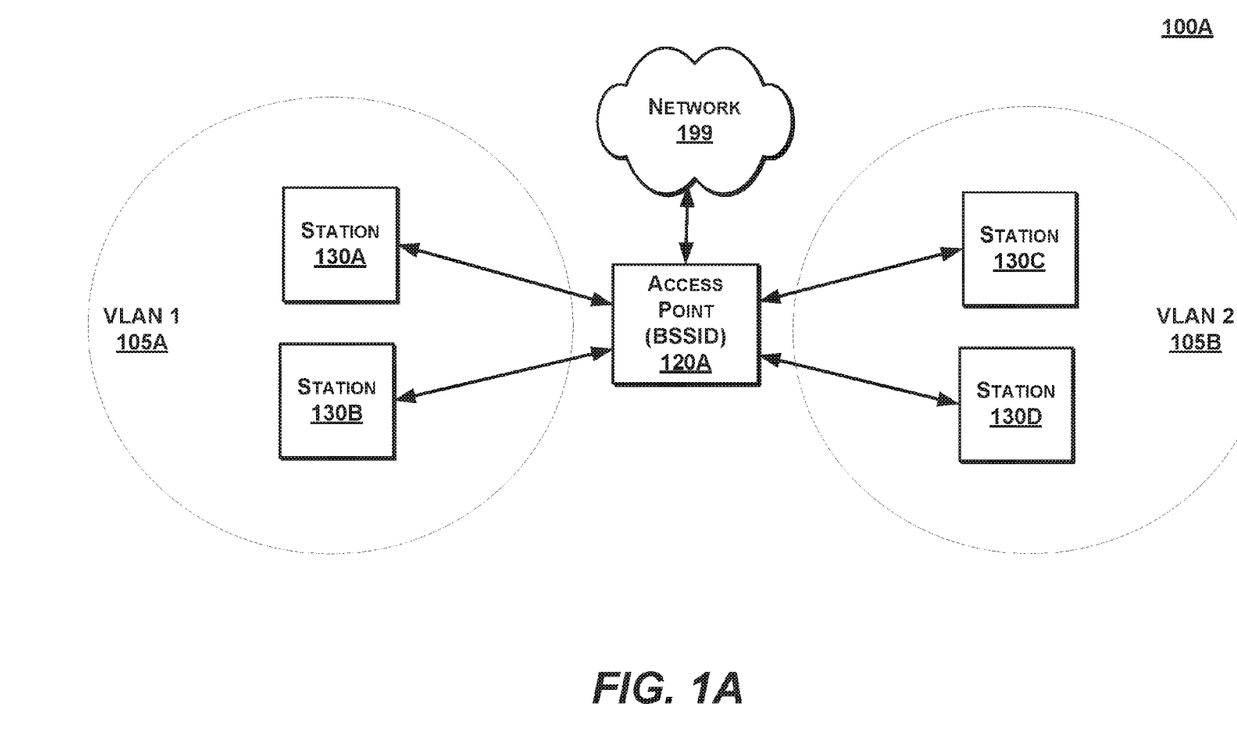
FIG. 1A is a high-level block diagram illustrating a system for restricting broadcast traffic to a VLAN (virtual local access network) in a wireless network, according to one embodiment.
Figure 1B:
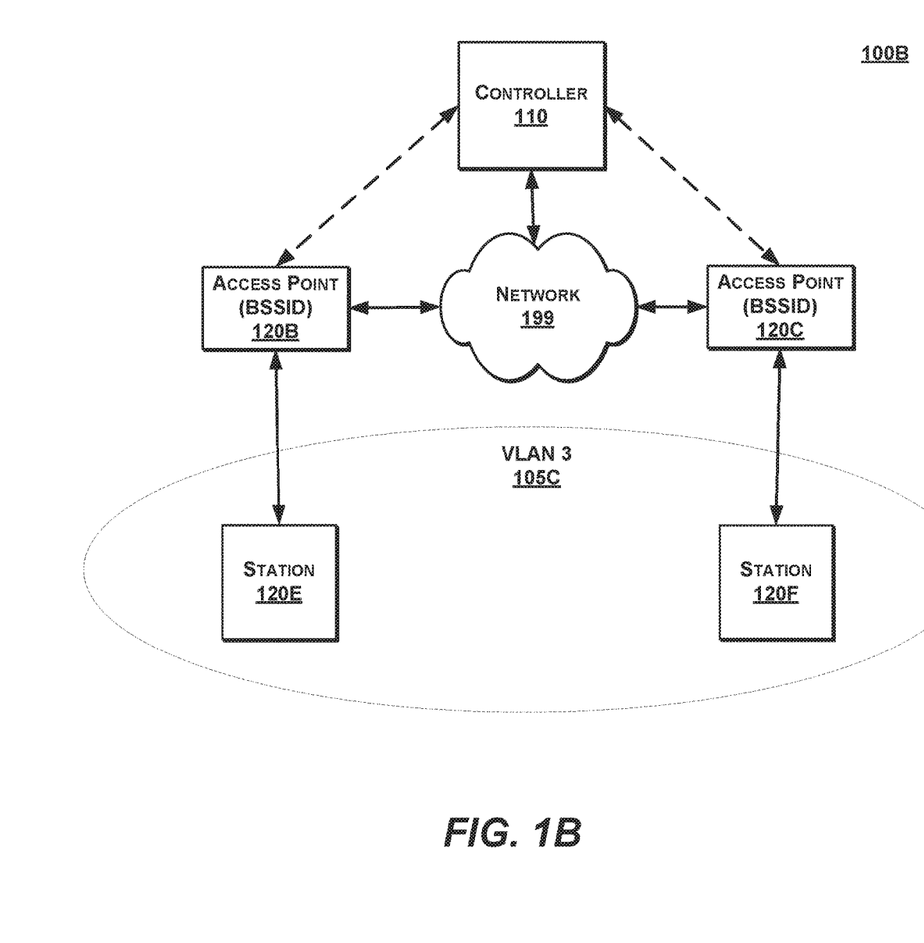
FIG. 1B is a high-level block diagram illustrating a system for restricting broadcast traffic to a VLAN in a wireless network with virtual cell, according to one embodiment.
Figure 2A:
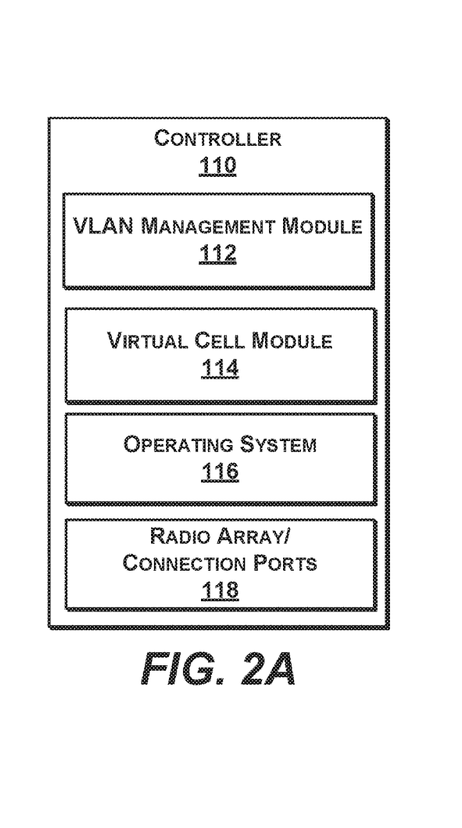
FIG. 2A is a more detailed block diagram illustrating a controller of the system of FIGS. 1A-1B, according to one embodiment.
Figures 2B, 2C:
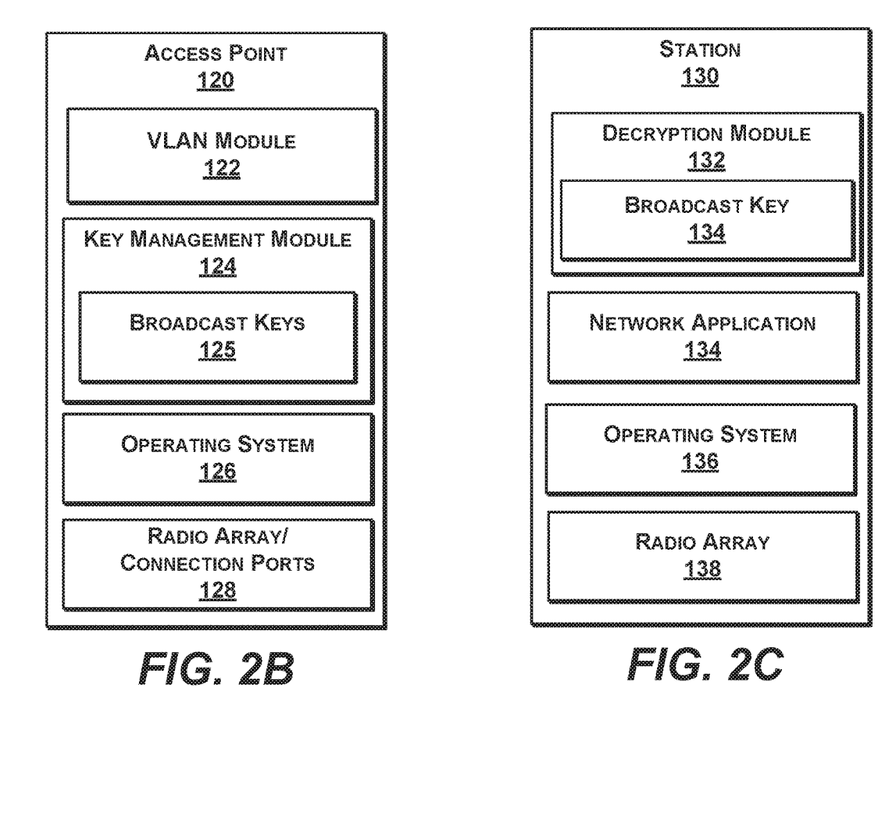
FIG. 2B is a more detailed block diagram illustrating an access point of the system of FIG. 1B, according to one embodiment.
FIG. 2C is a more detailed block diagram illustrating a station of the system of FIGS. 1A-1B, according to one embodiment.

Systems to Restrict Broadcast Traffic to a VLAN (FIGS. 1-2)

FIG. 1A is a high-level block diagram illustrating a system 100 for restricting broadcast traffic for a VLAN on a wireless network, according to one embodiment. The system 100A includes an access point 120 which is in turn coupled to stations 130A-D and also coupled to a network 199. Other embodiments of the system 100 can include additional network components that are not shown in FIG. 1A (e.g., see FIG. 1B). For example, there can be more access points, more mobile stations. There can also be switches, routers, fire walls, proxy servers, and the like. The network 199 is preferably a wireless network operating under IEEE 802.11-type protocols, but can also be a hybrid network including some wired components.

Figure 6:
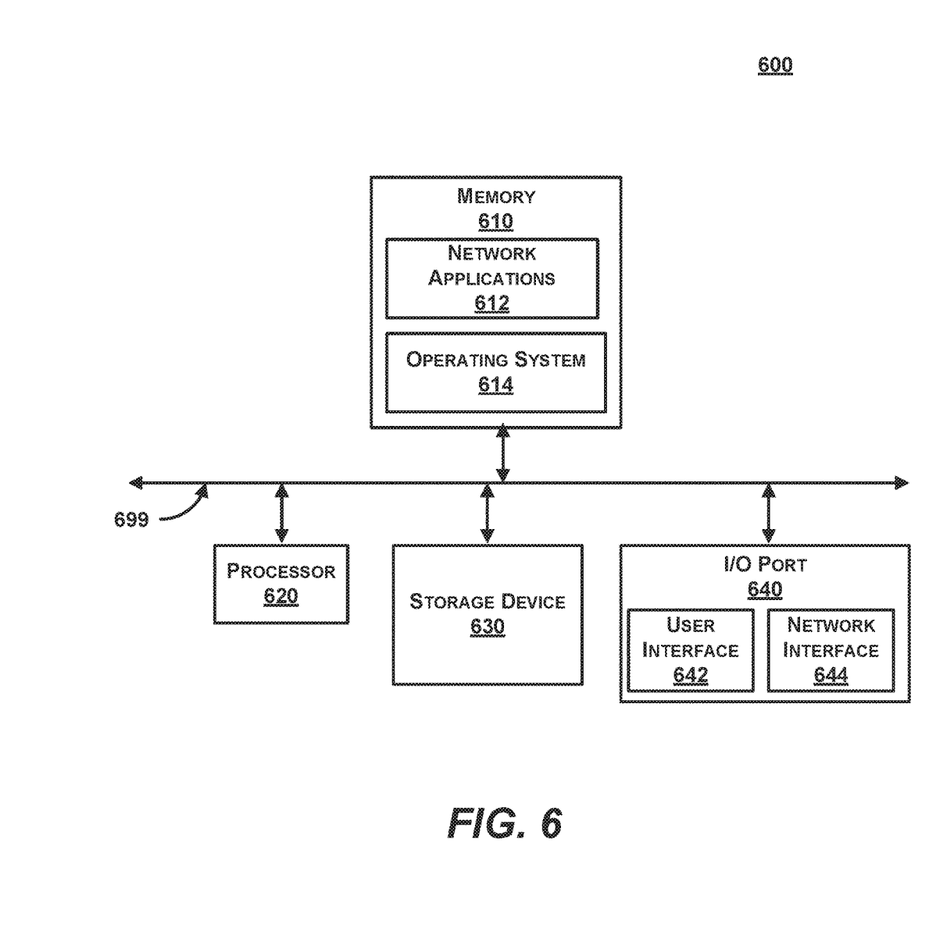
FIG. 6 is a block diagram illustrating an exemplary computing device, according to one embodiment.

The access point 120 can be any suitable computing device, such as a personal computer, a server blade, any computing environment as shown in FIG. 6. For example, the access point 120 can be an AP 110 or AP 433 by Meru Networks of Sunnyvale, Calif. (modified as discussed herein). Access point 120 is preferably connected to the network 199 (or to a switch, router, hub, or another access point that is connected to the network 199) via a wired or wireless connection. In one embodiment, the functionality is incorporated into a switch or router. In operation, the access point 120 provides access to a wired network for wireless devices such as stations 130A-D. A BSSID (basic service set identifier) assigned to the access point 120 distinguishes the access point from other devices that receive transmissions from a station. The BSSID is broadcast in beacon frames at regular intervals for use by stations requesting to connect to the access point 120 for network connectivity.

In one embodiment, the access point 120 implements a VLAN in the network 199 by restricting broadcast traffic. A dedicated address for a VLAN (e.g., an Ethernet broadcast or a multicast address) allows network components to communicate with all members of the VLAN by sending a single frame to a network address set up at the access point 120. Once the VLAN is configured, a group key is distributed to members of a VLAN for decrypting broadcast and multicast frames sent from the access point 120. For example, a first group key is sent to members of a first VLAN and a second group key is sent to members of a second VLAN. When frames addressed to any VLAN are received, the access point 120 uses a corresponding group key for encryption before broadcasting to connected stations. However, only stations also having the corresponding group key are able to properly decrypt the encrypted frames. Consequentially, broadcast packets are restricted to a particular VLAN by the access point 120. Additional embodiments of the access point 120A-120N are set forth below in FIG. 1C.

VLAN 1 105A includes stations 130A and 130G and VLAN 2 105G includes stations 130C and 130D. These VLANs can correspond to, for example, different meeting rooms in a building, different product teams of an entity, different levels of employee security, and the like. VLANs can be formed prior to any members connecting to the access point 120A, or retroactively after members are already connected.

The stations 130A-130D can be, for example, a personal computer, laptop computer, tablet computer, smart phone, mobile computing device, Internet appliance, end station or any other computing device as described in FIG. 6. Stations 130A-130D are wirelessly coupled to the access point 120. No pre-configuration or downloaded client is needed in a preferred embodiment operating under standard protocols, but can be used to provide enhanced features in other embodiments. The stations 130A-130D operate according to wireless standards such as IEEE 802.11a, b, g, n, ac or any other wireless standard. The stations 130A-130D send and/or receive network packets as data for applications running on the devices.

In one embodiment, the stations 130A-130D listen to all traffic sent from the access point 120. For encrypted broadcast and multicast traffic, a locally stored, group key is applied in an attempt to decrypt. Successfully decrypted frames are processed by a station while frames that are unable to be decrypted are ignored. In some embodiments, the decrypted frames are passed to a device networked to the particular station, such as in a mesh network In some embodiments, the stations 130A-130D set up a group key using IEEE 802.11i or 802.1X as described herein. Additional embodiments of the stations 130A-130D are discussed in more detail below in association with FIG. 1D.

FIG. 1B is a high-level block diagram illustrating a system 100B for restricting broadcast traffic for a VLAN on a wireless network with virtual cell, according to one embodiment. The system 100 includes a controller 110 and access points 110A-110B which are in turn coupled to stations 130E-130F and also coupled to the network 199. Other embodiments of the system 100B can include additional network components that are not shown in FIG. 1B. In one example, there can be additional access points, and in another example there is no controller 110.

The controller 110 (e.g., an MC1500 or MC6000 device by Meru Networks of Sunnyvale, Calif.) in the network architecture is in communication with each of multiple access points 110A-110B. The controller 110 can be any of the computing devices discussed above or any other computing device as described in FIG. 6. The functionality can be incorporated into other devices in communication with the access points 110A-110B.

In one embodiment, the controller 110 provides a virtual cell service mode to a station within a domain by making the same BSSID available as the station travels around the wireless network. Each of the individual access points 110A-110B provide a limited range of coverage, and when coordinated, provide a greater range of coverage using a single BSSI without disruption to a station. For example, as station 130E moves out of range of the access point 120A and is sensed within the range of the access point 120B, the controller 110 directs a soft handoff. In response, the access point 120B takes over communications while the access point 120N ignores frames addressed from the station 1120E. This soft handoff can be invisible to the station 130E in that there is no need for local reconfiguration. The soft handoff repeats as a user continues to move amongst different coverage ranges, without interruption of service. In other words, the BSSID is persistent across different access points.

VLAN 3 105C includes the stations 130E and 120F. Due to the virtual cell service, VLAN frames are received by both access points 110A and 110B for redistribution. At this point, the access points 110A, 110B operate in a similar manner to the access point 120 of FIG. 1 in that a group key encrypts the VLAN frames for restricted broadcasting within the individual coverage areas. Because the stations 130E and 120F can be mobile, at different times both may be connected to the same access point as is the case in FIG. 1.

FIG. 2A is a more detailed block diagram illustrating the controller 110 of the system 100B of FIG. 1B, according to one embodiment. The controller 110 includes a VLAN management module 112, a virtual cell module 114, an operating system 116 and a radio array/connection ports 118. The components can be implemented in hardware, software, or a combination of both.

The VLAN management module 112 can also be implemented (in part or in whole) at the access point level. In one aspect, the VLAN management module 112 provides a user interface allowing a network administrator to remotely configure VLANs (e.g., membership, authentication credentials, behavior, and the like). In another aspect, the VLAN management module 112 manages access points when operating in virtual cell mode. More particularly, a VLAN frame may be addressed to a particular access point which initially configured the address based on VLAN members connected at that time. The virtual cell services hands off stations to that change coverage areas to a different access point (see FIG. 1B), making the VLAN address stale in relation to handed off stations. The VLAN management module 112 is able to determine which access points need a copy of the VLAN frame in order to distribute the VLAN frame to all members. In a simplified approach, the VLAN management module 112 can broadcast all detected VLAN frames to all access points which in turn perform restricted broadcasting, so that VLAN frames are broadcasted across the entire coverage area.

The virtual cell module 114 assigns access points for communication with particular stations. Each access point shares a common BSSID so that stations can use the same BSSID at any location in the coverage area. Based on a table of mapping assignments of access points to stations that is maintained by the virtual cell module 114, only the assigned access point responds. Unassigned access points can ignore frames detected by unassigned stations.

The operating system 116 interfaces between the software and hardware of the controller 110. The operating system 116 can also include integrated applications. Further, the operating system 116 manages connections to access points around a wireless network that are managed by the controller 110.

The radio array/connection ports 118 represent physical access to communication channels or mediums. A radio array can include one or more transmit (Tx) and receive (Rx) antennas for communication with the physical layer. Some mobile stations 130 include separate antennae for IEEE 802.11a, IEEE 802.11b, IEEE 802.11n, and IEEE 802.11 ac. Other mobile stations 110 include several antenna dedicated for separate transmit and receive paths using the MIMO functionality of IEEE 802.11ac. Antennae can be tuned for IEEE 802.11 transmissions. An Ethernet port can allow plug-in connections to a wired medium using a RJ-45 jack, or the like.

FIG. 2B is a more detailed block diagram illustrating the access point 120 (generic reference to access points 120, 120A and 120B) of the systems 100A and 100B of FIGS. 1A and 1B, according to one embodiment. The access point 120 comprises a VLAN module 122, a key management module 124, an operating system 126, and a radio array/connection ports 128. The components can be implemented in hardware, software, or a combination of both.

The VLAN module 122 configures VLAN membership. When a new VLAN is formed, or when a new member is connected, the VLAN module distributes group key(s). In one embodiment, the VLAN module 122 transmits a group key in response to a connection request (e.g., in accordance with IEEE 802.11i standards). In another embodiment, the VLAN module 122 causes transmission of the group key during authentication. In the case of IEEE 802.1X, a RADIUS server authenticates a station, and provides a group key afterwards. The RADIS server can be incorporated into the VLAN module 122, or decoupled as a separate device.

The key management module 124 generates and stores group keys 125. In some embodiments, keys are generated on-the-fly when a VLAN is configured. In other embodiments, keys are received from external sources such as the controller 110 or a server such as RADIUS server. When a VLAN is deleted, the associated group key can be removed from the group keys 125. In an embodiment, the access point 120 generates group keys comprising, for example, a 128 bit AES (Advanced Encryption Standard) or a WEP (Wired Equivalent Privacy) cipher. In some embodiments, the access point 120 set up group keys using IEEE 802.11i or 802.1X as described herein.

The operating system 124 interfaces between the software and hardware of the access point 120. The operating system 124 can also include integrated applications. The operating system 124 can handle connections to stations by sending out beacons.

The radio array/connection ports 126 represent physical access to communication channels or mediums similar to the radio array/connection ports 116 discussed above.

FIG. 2C is a more detailed block diagram illustrating a station 130 (generic reference to stations 130A-130F) of the systems 100A and 100B of FIGS. 1A and 1B, according to one embodiment. The station 130 comprises a decryption module 132, a network application 134, an operating system 136, and a radio array 138. The components can be implemented in hardware, software, or a combination of both.

The decryption module 132 applies a group key 133 to encrypted broadcast frames. Frames that are decrypted successfully can be processed by the operating system 136 and used by the network application 134. The decryption module 132 drops frames that are not decrypted successfully are dropped, as these frames were likely intended for a different VLAN. In some embodiments, the decryption module 132 also decrypts non-VLAN encrypted frames.

The network application 132 can be any application executing on the mobile station 130 that makes use of network access in operation. Examples of the network application 132 include a network browser, a VOIP telephone service, a streaming video player, a database viewer, a VPN client, and the like.

The operating system 134 is responsible for connecting to a communication channel for data exchange, among other tasks. To do so, the operating system 134 listens for beacons broadcast by access points, and generates a probe request to connect to a selected access point. After connecting, the operating system 134 exchanges data packs and unpacks data packets in accordance with, e.g., a TCP/IP stack. More particularly, IEEE 802.11-type packets (e.g., IEEE 802.11ac packets) can be generated and received. In some embodiments, the operating system 134 comprises Windows 7, or the like, which integrates support for standards such as IEEE 802.11i and/or IEEE 802.1X.

The radio array 136 includes one or more transmit (Tx) and receive (Rx) antennas for communication with the physical layer, as described above in association with radio array/connection ports 116 and 126.

Figure 3:
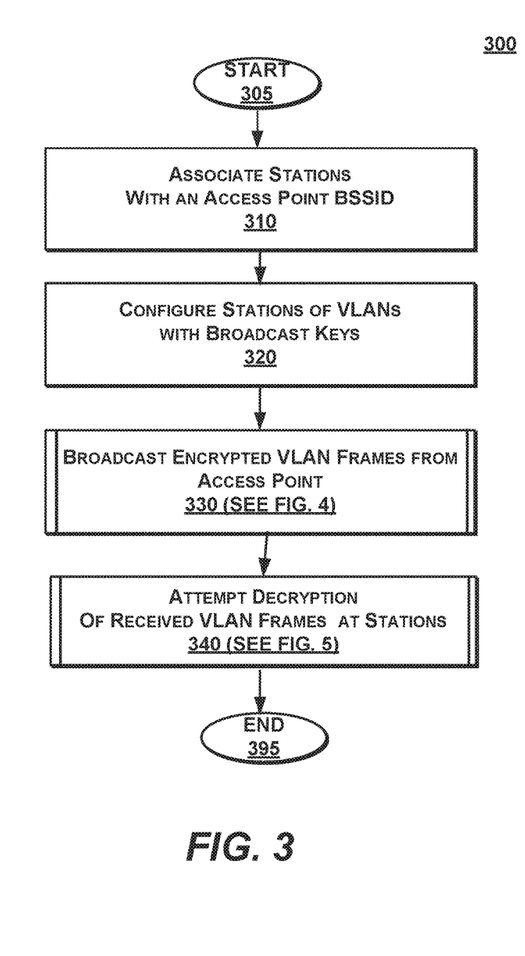
FIG. 3 is a high-level flow diagram illustrating a method for restricting broadcast traffic to a VLAN in a wireless network, according to one embodiment.
Figure 4:
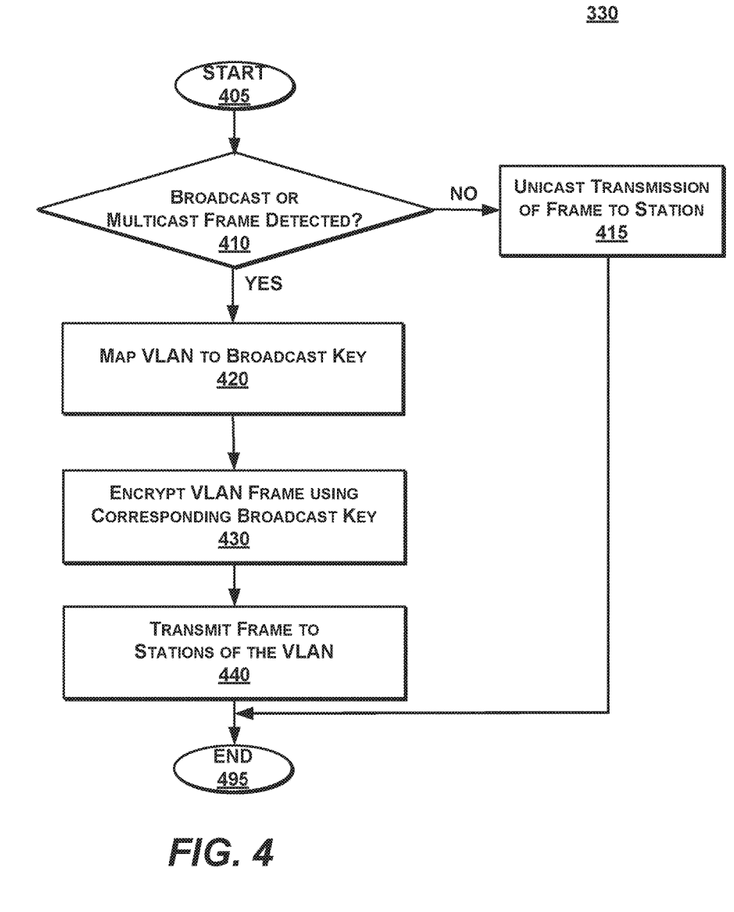
FIG. 4 is a more detailed flow diagram illustrating a step of broadcasting encrypted VLAN frames in the method of FIG. 3, according to one embodiment.
Figure 5:
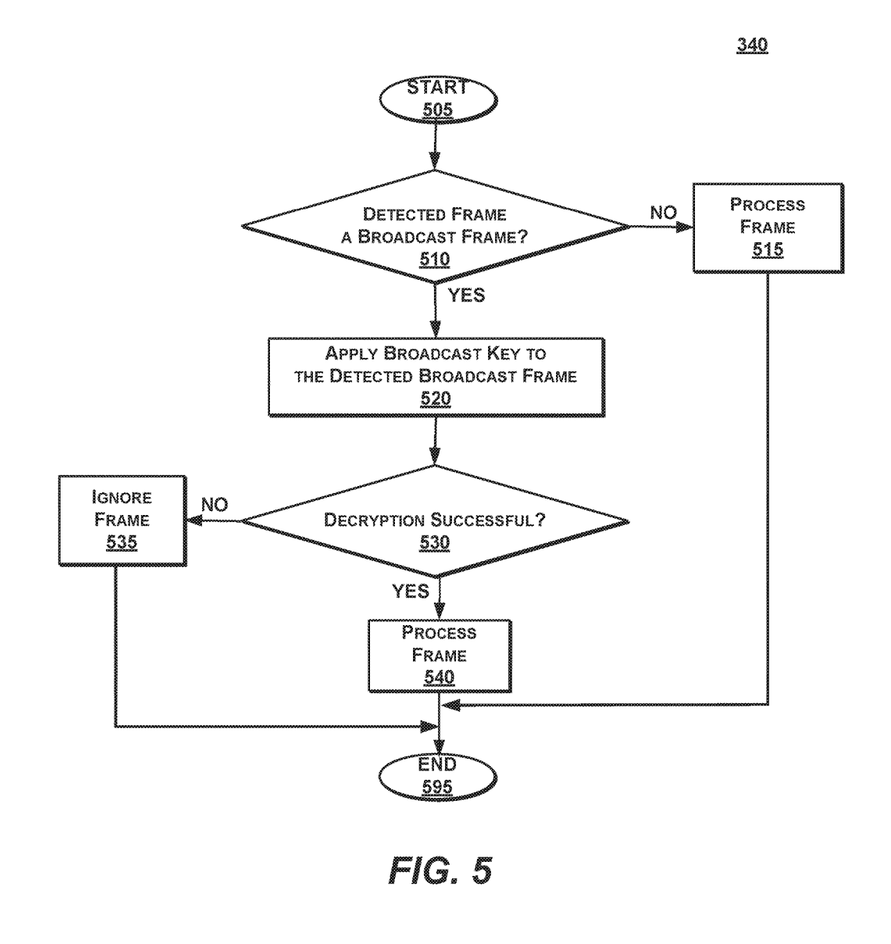
FIG. 5 is a more detailed flow diagram illustrating a step of attempting decrypting VLAN frames in the method of FIG. 3, according to one embodiment.

Methods for Restricting Broadcast Traffic to a VLAN (FIGS. 3-5)

FIG. 3 is a high-level flow diagram illustrating a method 300 for restricting broadcast traffic to a VLAN in a wireless network, according to one embodiment. The method 300 can be implemented by, for example, the systems 100A and 100B of FIG. 1A and FIG. 1B, accordingly.

At step 310, stations are associated with an access point BSSID. In one implementation, an access point openly broadcast a BSSID in beacons are regular intervals. An unconnected station receives beacons from one or more access points and chooses (e.g., as directed by a user) a particular access point for connection. The station responds to the access point with a connection request. The BSSID can be different for each access point, or shared between multiple access points to effect virtual cell service as described above.

At step 320, stations of VLANs are configured with group keys. If the connecting station has been preconfigured to join a particular VLAN, the access point embeds a corresponding group key in the response to the connection request. In one embodiment, the key is sent in accordance with standards such as IEEE 802.11i and/or IEEE 802.1X.

At step 330, encrypted VLAN frames from access point are broadcast. Additional embodiments are set forth below with respect to FIG. 4.

At step 340, decryption of received VLAN frames is attempted at stations. All stations receiving the broadcast, especially those associated with the BSSID can attempt to process the broadcast frames. More details of step 340 are described below with respect to FIG. 5.

FIG. 4 is a more detailed flow diagram illustrating a step of broadcasting encrypted VLAN frames in the method of FIG. 3, according to one embodiment.

At step 410, if a broadcast or a multicast frame is detected, a VLAN is mapped to a group key at step 420. VLAN frames can be indicated by a destination address, such as an IP address or a specific port number of an IP address. When the VLAN is configured, the access point (or other network device) generates and stores a mapping between an assigned address and addresses of VLAN members. As a result, frames can be sent to all of the VLAN members using a single address.

If frames are not for a VLAN, normal unicast processing can occur at step 415. Rather than broadcasting to an address recognized by all connected stations, an address of a specific station is used.

At step 430, a VLAN frame is encrypted to using a group key corresponding to the VLAN. The encryption prevents stations that are able to receive the frames, whether or not addressed to them, from being able to read the contents. Instead, the data is indiscernible.

At step 440, the frame is transmitted to stations of the VLAN. The transmission can be handled by an operating system in an access point with integrated TCP/IP support. At the physical layer, a uses electromagnetic radio transmitters and receivers. The broadcast can be received by any appropriate radio within coverage range regardless as to whether the radio is part of the VLAN, but is typically ignored if not specifically addressed to a computing device associated with the radio. The restricted broadcasting described herein can prevent radios unassociated with the VLAN from being able to reconstruct broadcast frames.

FIG. 5 is a more detailed flow diagram illustrating a step of attempting decrypting VLAN frames in the method of FIG. 3, according to one embodiment.

At step 510, if a broadcast frame is detected, a group key is applied at step 520. The group key decodes the indiscernible data back its original form. At step 530, if decryption is successful, the frame is processed at step 540.

On the other hand, if the detected frame is not a broadcast frame at step 510, the frame can be processed as a unicast frame at step 515. Implementations are variable, but non broadcast frames can also include a decryption component using the group key or other key. However, if the decryption is unsuccessful during frame processing at step 515, some implementations may invoke an exception process or error routine rather than simply ignoring the frame.

If the decryption at step 530 is unsuccessful for broadcast frames, the frame is ignored at 535, the implication being that the frame was intended for a different VLAN.

Generic Computing Device (FIG. 6)

FIG. 6 is a block diagram illustrating an exemplary computing device 600 for use in the system 100 of FIG. 1A, according to one embodiment. The computing device 600 is an exemplary device that is implementable for each of the components of the system 100, including the access point 120, and the mobile stations 130A, B. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications or access points as illustrated in FIGS. 6 and 7. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Windows 7, Windows 8, Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage device 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an access point of a wireless network, for restricting broadcast traffic to a VLAN (virtual local area network), the method comprising the steps of:
   associating a plurality of stations with a BSSID (basic service set identifier);
   receiving a list of members of a first VLAN;
   configuring a first VLAN by sending a first group key to each station from the plurality of stations that is a member of the first VLAN, wherein each VLAN is associated with a unique group key sent to stations of each VLAN using the IEEE 802.1X protocol, and wherein the unique group key decrypts frames sent by the access point for decryption only by the plurality of stations in the specific group and the unique group key also decrypts general, non-VLAN frames sent by the access point for decryption by any of the plurality of stations;
   receiving one or more frames addressed to the first VLAN at either a broadcast port or a multicast port of the access point;
   determining if the one or more frames is at least one of a broadcast frame and a multicast frame;
   in response to a determination that the one or more frames is at least one of a broadcast frame and a multicast frame:
   mapping the first group key to the first VLAN, wherein the mapping stores an assigned address between the first VLAN and the corresponding addresses of all first VLAN members;
   encrypting the one or more frames with the first group key to prevent stations without the first group key from being able to decrypt the one or more frames, wherein the plurality of stations process successfully decrypted frames and ignore frames that are not successfully decrypted; and
   broadcasting the one or more encrypted VLAN frames to the plurality of stations associated with the BSSID;
   wherein at least one station from the first VLAN is handed-off to a different access point while retaining membership in the first VLAN.

2. The method of claim 1, further comprising:
   configuring a second VLAN by sending a second group key to each station that is a member of the second VLAN;
   receiving one or more frames addressed to the second VLAN;
   encrypting the one or more frames with the second group key to prevent stations without the second group key from being able to decrypt the one or more frames.

3. The method of claim 1, further comprising:
   receiving a list of members of the first VLAN.

4. The method of claim 1, wherein the one or more frames are addressed to either a broadcast port or a multicast port of the access point.

5. The method of claim 1, wherein the access point is part of a virtual cell service provided by the wireless network in which the BSSID is also associated with at least one other access points in the wireless network and at least one station from the first VLAN is connected to one of the at least one other access points.

6. The method of claim 1, wherein the first group key is sent to the station using the IEEE 802.1X protocol.

7. The method of claim 1, wherein the first group key also decrypts general, non-VLAN frames sent by the access point to the plurality of stations.

8. The method of claim 1, wherein the members of the first VLAN comprise a subset of stations associated with the BSSID.

9. The method of claim 1, wherein the station processes successfully decrypted frames and ignores frames that are not successfully decrypted.

10. The method of claim 1, wherein the wireless network comprises an IEEE 802.11-type network.

11. A non-transitory computer-readable medium storing instructions that, when executed by a processor, perform a method in an access point of a wireless network, for restricting broadcast traffic to a VLAN (virtual local area network), the method comprising:
   associating a plurality of stations with a BSSID (basic service set identifier);
   receiving a list of members of a first VLAN;
   configuring a first VLAN by sending a first group key to each station from the plurality of stations that is a member of the first VLAN, wherein each VLAN is associated with a unique group key sent to stations of each VLAN using the IEEE 802.1X protocol, and wherein the unique group key decrypts frames sent by the access point for decryption only by the plurality of stations in the specific group and the unique group key also decrypts general, non-VLAN frames sent by the access point for decryption by any of the plurality of stations;
receiving one or more frames addressed to the first VLAN at either a broadcast port or a multicast port of the access point;
determining if the one or more frames is at least one of a broadcast frame and a multicast frame;
in response to a determination that the one or more frames is at least one of a broadcast frame and a multicast frame:
mapping the first group key to the first VLAN, wherein the mapping stores an assigned address between the first VLAN and the corresponding addresses of all first VLAN members;
encrypting the one or more frames with the first group key to prevent stations without the first group key from being able to decrypt the one or more frames, wherein the plurality of stations process successfully decrypted frames and ignore frames that are not successfully decrypted; and
broadcasting the one or more encrypted VLAN frames to the plurality of stations associated with the BSSID;
wherein at least one station from the first VLAN is handed-off to a different access point while retaining membership in the first VLAN.

12. The computer-readable medium of claim 11, the method further comprising:
configuring a second VLAN by sending a second group key to each station that is a member of the second VLAN;
receiving one or more frames addressed to the second VLAN;
encrypting the one or more frames with the second group key to prevent stations without the second group key from being able to decrypt the one or more frames.

13. The computer-readable medium of claim 11, the method further comprising:
receiving a list of members of the first VLAN.

14. The computer-readable medium of claim 11, wherein the one or more frames are addressed to either a broadcast port or a multicast port of the access point.

15. The computer-readable medium of claim 11, wherein the access point is part of a virtual cell service provided by the wireless network in which the BSSID is also associated with at least one other access points in the wireless network and at least one station from the first VLAN is connected to one of the at least one other access points.

16. The computer-readable medium of claim 11, wherein the first group key is sent to the station using the IEEE 802.1X protocol.

17. The computer-readable medium of claim 11, wherein the first group key also decrypts general, non-VLAN frames sent by the access point to the plurality of stations.

18. The computer-readable medium of claim 11, wherein the members of the first VLAN comprise a subset of stations associated with the BSSID.

19. The computer-readable medium of claim 11, wherein the station processes successfully decrypted frames and ignores frames that are not successfully decrypted.

20. The computer-readable medium of claim 11, wherein the wireless network comprises an IEEE 802.11-type network.

21. An access point of a wireless network, for restricting broadcast traffic to a VLAN (virtual local area network), the access point comprising:
a processor;
a communication interface; and
a memory, communicatively coupled to the processor and communication interface, and storing:
a first module to associate a plurality of stations with a BSSID (basic service set identifier);
a second module to receive a list of members of a first VLAN;
a third module to configure a first VLAN by sending a first group key to each station from the plurality of stations that is a member of the first VLAN, wherein each VLAN is associated with a unique group key sent to stations of each VLAN using the IEEE 802.1X protocol, and wherein the unique group key decrypts frames sent by the access point for decryption only by the plurality of stations in the specific group and the unique group key also decrypts general, non-VLAN frames sent by the access point for decryption by any of the plurality of stations;
a fourth module to receive one or more frames addressed to the first VLAN at either a broadcast port or a multicast port of the access point;
a fifth module to determine if the one or more frames is at least one of a broadcast frame and a multicast frame;
a sixth module, in response to a determination that the one or more frames is at least one of a broadcast frame and a multicast frame, to map the first group key to the first VLAN, wherein the mapping stores an assigned address between the first VLAN and the corresponding addresses of all first VLAN members;
a seventh module to encrypt the one or more frames with the first group key to prevent stations without the first group key from being able to decrypt the one or more frames, wherein the plurality of stations process successfully decrypted frames and ignore frames that are not successfully decrypted; and
a eighth module to broadcast the one or more encrypted VLAN frames to the plurality of stations associated with the BSSID,
wherein at least one station from the first VLAN is handed-off to a different access point while retaining membership in the first VLAN.

* * * * *